Figure 1:
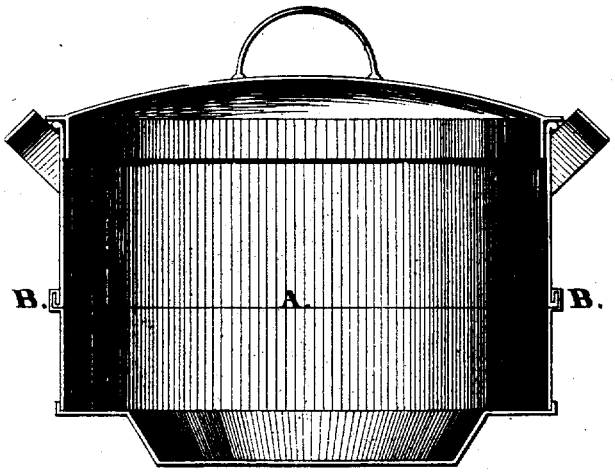

BEST AVAILABLE COPY 47,025

W. Kroeger,

Domestic Boiler.

No. 4188. Reissued Nov. 29. 1870.

WITNESS.
Chas. A. Smith
W. M. Hornor,

INVENTOR.
Werner Kroeger
By J. B. Smith
his Atty

N. PETERS, PHOTO-LITHOGRAPHER, WASHINGTON, D. C.

4,188. — [illegible] BOILING. — Werner [illegible]

United States Patent Office.

WERNER KRŒGER, OF MILWAUKEE, WISCONSIN, ASSIGNOR TO WILLIAM FRANKFURTH, OF SAME PLACE.

Letters Patent No. 47,025, dated March 28, 1865; reissue No. 4,188, dated November 29, 1870.

IMPROVEMENT IN VESSELS FOR BOILING.

The Schedule referred to in these Letters Patent and making part of the same.

I, WERNER KRŒGER, of Milwaukee, in the county of Milwaukee andState of Wisconsin, have invented certain Improvements in Culinary Vessels, of which the following is a specification.

*Nature and Objects of the Invention.*

This invention consists in applying a copper, brass, or any other non-corroding metal band between the bottom and top of tin vessels used for boiling, cooking, and heating purposes generally.

*Description of the Drawing forming part of this Specification.*

Figure 1 is a vertical sectional view.

*General Description.*

To a vessel, A, of any form, I apply a band, B, which, at its upper rim, is united by a joint to the sides of the vessel A.

At the bottom the band B is joined to the bottom of the vessel in any suitable manner.

This band B may be of any vertical width, relatively to the height of the vessel A, and it is intended to be applied to any tin vessel, boiler, pot, or kettle with copper, brass, or non-corroding metal bottom, used for heating or boiling fluids on stoves.

*Claim*

I claim as my invention—

The band B, applied to tin vessels in the manner substantially as described.

Witnesses: WERNER KRŒGER.

J. B. SMITH,

W. M. HORNOR.